(12) United States Patent
Suzuki et al.

(10) Patent No.: US 6,399,669 B1
(45) Date of Patent: Jun. 4, 2002

(54) POROUS MATERIAL AND A METHOD FOR PRODUCING THE SAME

(75) Inventors: Masaaki Suzuki; Takashi Hashida, both of Osaka; Yukiyoshi Ono, Hirakata, all of (JP)

(73) Assignee: Matsushita Electric Industrial Co., Ltd., Osaka-fu (JP)

( * ) Notice: Subject to any disclaimer, the term of this patent is extended or adjusted under 35 U.S.C. 154(b) by 0 days.

(21) Appl. No.: 09/398,585

(22) Filed: Sep. 17, 1999

(30) Foreign Application Priority Data

Sep. 17, 1998 (JP) ............................................. 10-263212

(51) Int. Cl.⁷ .................................................. C08J 9/00
(52) U.S. Cl. ........................ 521/183; 521/184; 521/185; 521/189
(58) Field of Search ................................. 521/183, 184, 521/185, 189

(56) References Cited

U.S. PATENT DOCUMENTS 4,272,467 A    6/1981   Johnson
4,474,662 A    10/1984  Makino et al.
5,231,162 A  * 7/1993   Nagata et al. .............. 528/353
5,776,990 A    7/1998   Hedrick et al.

OTHER PUBLICATIONS

D. D. Burleigh "Thermal Conductivity of a Polymide Foam" –*Thermal Conductivity* 18: 437–443 (1985).

* cited by examiner

*Primary Examiner*—Morton Foelak
(74) *Attorney, Agent, or Firm*—Akin, Gump, Strauss, Hauer & Feld, L.L.P.

(57) ABSTRACT

A porous material made of a dry gel of a polyimide resin having an apparent density of 800 kg/m³ or less and a mean pore size of 1 μm or less is disclosed. The porous material exhibits high heat resistance and is low in density and mean pore size. The use of the porous material provided by the present invention can produce not only a heat insulator with a low thermal conductivity and high heat insulation but also an insulating material having a low dielectric constant and exhibiting excellent dielectric characteristics at high frequencies. The present invention can also provide a semiconductor circuit including the insulating material.

6 Claims, 2 Drawing Sheets

POROUS MATERIAL AND A METHOD FOR PRODUCING THE SAME

BACKGROUND OF THE INVENTION

The present invention relates to a highly heat-resistant porous material for use in construction materials, heat insulators and insulating materials and a method for producing the same.

Polyimide resins exhibit excellent heat resistance and superb insulation and therefore enjoy a wide application for liquid crystal alignment films, interlayer insulating films for semiconductor circuits, and the like. Active use of such advantages of polyimide resin and realization of a product exhibiting high performance by substituting the polyimide resin for a conventionally used resin have been investigated. Addition of a new function to the polyimide resin to a high addition value in the polyimide resin has also been studied.

One exemplary technical development in the polyimide resin is an attempt to reduce the dielectric constant or thermal conductivity of polyimide resin by forming the polyimide resin into a porous material. The technology for making the polyimide resin porous has been disclosed in, for example, the Japanese Laid-Open Patent Publication No. Hei 5-205526 and Thermal Conductivity, Vol. 18, pp. 437–443, 1985 (by D. D. Barley, entitled "Thermal Conductivity of a Polyimide Foam").

The Publication No. Hei 5-205526 discloses a method for forming a porous film by first forming a block copolymer of a polyimide matrix and a thermally decomposable polymer matrix, forming a film therefrom, and then removing the thermally decomposable polymer from the film by heating. The above-mentioned article discloses a process for making a foam by blowing a polyimide with the aid of a blowing agent.

The polyimide resin per se is much refractory to molding, because it is highly chemical resistant and has a glass transition point of 300° C. or higher. The disclosed methods for making this resin porous, therefore, have advantages and disadvantages. Now, the problem involved in the use of porous polyimide resin as, for example, a heat insulator will be discussed.

The method disclosed in the above-mentioned Japanese patent publication can produce a fine porous film having a pore size of 1 μm or less. However, the disclosed method has a drawback that it is not applicable to any low heat-resistant base because it includes a heating step for removing the thermally decomposable polymer. The disclosed technology in the above-mentioned article is also disadvantageous in that since formation of cells in the order of several hundred μm is inevitable, it is necessary to minimize the size of those cells in order to improve the heat insulation of the resultant foam. A variety of methods for making the polyimide resin porous have been attempted in addition to the above-mentioned methods.

Under the circumstance, however, these is no established technology for producing a porous material from the polyimide resin, and a technology which satisfies needed usage is experimented if occasion demands. In other words, there is a great demand for a method which can produce a porous material having a low density and a small mean pore size from the polyimide resin.

In view of the above-discussed problems, a primary object of the present invention is to provide a porous material having a low density and a small mean pore size. Another object of the present invention is to provide a method for producing such a porous material.

A further object of the present invention is to provide a heat insulator exhibiting high insulating performance and a semiconductor circuit with high dielectric characteristics comprising the heat insulator.

BRIEF SUMMARY OF THE INVENTION

In view of the above-mentioned objects, the porous material in accordance with the present invention is characterized by comprising a dry gel of a polyimide resin which has an apparent density of 800 kg/m$^3$ or less and a mean pore size of 1 μm or less.

The present invention relates to a porous material comprising a dry gel of a polyimide resin, said porous material having an apparent density of 800 kg/m$^3$ or less and a mean pore size of 1 μm or less.

The polyimide resin has preferably a three-dimensional crosslinked structure.

Also, the dry gel is preferably an aerogel.

It is preferably that the porous material having an apparent density of 800 kg/m$^3$ or less and a mean pore size of 1 μm or less.

Further, the present invention relates to a method for producing a porous material, comprising the steps of:
  gelling a polyimide resin to have a wet gel of the polyimide resin and
  drying said wet gel to remove a solvent from said wet gel thereby having a dry gel of said polyimide resin.

In the method, it is preferably that the gelling step comprises a step of forming a solution or a swollen body of a polyimide precursor and a step of imidizing said polyimide precursor in said solution or swollen body.

Also, the gelling step preferably comprises a step of obtaining a polyimide resin by imidizing a polyimide precursor, a step of forming a solution or a swollen body of said polyimide resin and a step of crosslinking said polyimide resin in said solution or swollen body.

Further, the gelling step preferably comprises a step of forming a solution or a swollen body of a polyimide precursor, a step of forming a wet gel of said polyimide precursor by crosslinking said polyimide precursor in said solution or swollen body and a step of imidizing said polyimide precursor in said wet gel.

Also, the present invention relates to a method for producing a porous material, said method comprising the steps of:
  forming a solution or a swollen body of a polyimide precursor;
  gelling said polimide precursor by crosslinking said polyimide precursor in said solution or swollen body to form a wet gel of said polyimide precursor;
  drying said wet gel to remove a solvent therefrom to form a dry gel of said polyimide precursor; and
  imidizing said polyimide precursor in said dry gel to form a dry gel of a polyimide resin.

In the above-mentioned method for producing a porous material, the drying step preferably uses an supercritical drying method and a finally obtained dry gel is an aerogel.

In addition, it is preferable that these method further comprises a step of heating said dry gel of said polyimide resin in an inert atmosphere at 500° C. or higher to form a porous material comprising a carbon material.

In these method, it is preferable that a finally obtained porous material has an apparent density of 800 kg/m$^3$ or less and a mean pore size of 1 μm or less.

The present invention relates to a heat insulator formed by filling the above-mentioned porous material.

It is preferable that the vessel is a gas-tight vessel and has been reduced in internal pressure.

Further, the present invention relates to a semiconductor circuit formed by using the above-mentioned porous material, said circuit being formed with an interlayer insulating film which effects electrical insulation between a plurality of electrode lines arranged on a base plate.

DETAILED DESCRIPTION OF THE INVENTION

Figure 1:
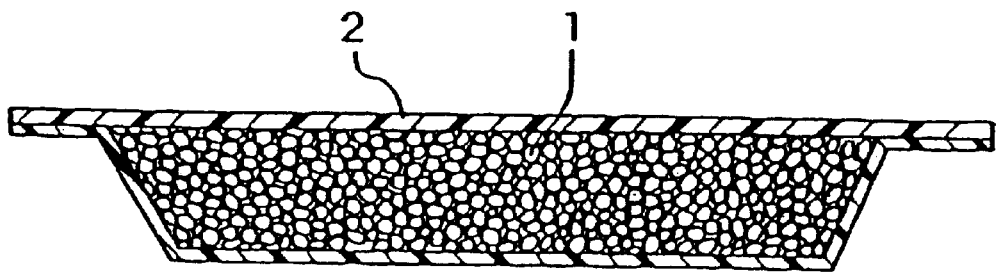
FIG. 1 is a cross-sectional view of a heat insulator including the porous material in accordance with the present invention.

The porous material in accordance with the present invention is a composition comprising a dry gel having consecutive communicating micropores and a fine gel structure or skeleton. This composition enables the porous material to exhibit high heat insulation. Since the porous material in accordance with the present invention has a high porosity, it can function as an insulating material with a low dielectric constant.

The dry gel used in the present invention can be obtained by drying a wet gel having a gel skeleton formed from a solvent-containing resin. The pores of the dry gel resulting from evaporation of the solvent from the wet gel are solids and contain air. When the dry gel is an aerogel obtained by drying the wet gel by an supercritical drying method, heat insulation and dielectric characteristics of the resultant porous material are conveniently increased.

The polyimide resin used in the present invention can be obtained by synthesizing a polyamide acid as a precursor (hereinafter referred to as "polyimide precursor") from a starting material and subsequently imidizing the polyimide precursor.

The polyimide resin in the context of the present invention involves a wide variety of polyimide ranging from those of common classification to synthetic polymers whose molecular structure of main chain is an imide ring structure, such as polyamide imide, polyether imide and so on. Any of the above-exemplified polyimide resins exhibit excellent heat resistance, electric insulation, chemical resistance and resistance against environment.

In the following, the porous material in accordance with the present invention will be described.

As noted above, the porous material in accordance with the present invention is a dry gel comprising a polyimide resin, wherein the polyimide resin constitutes a matrix skeleton of the gel and the pores of the dry gel contain air. Particularly, when the dry gel has an apparent density of 800 kg/m$^3$ or less and a mean pore size of 1 $\mu$m or less, it can be a porous material exhibiting high heat insulation and excellent dielectric characteristics, that is, high electric insulation.

The thermal conductivity of the porous material in accordance with the present invention is determined by totalizing the thermal conductivity of the skeleton of the porous material, that of the air in the pores, and that produced by radiation and convection. Increased heat insulation can be achieved by reducing each thermal conductivity. The porous material in accordance with the present invention prevents the air from flowing by the gel skeleton and therefore the thermal conductivity by radiation and convection is much smaller than the other two thermal conductivities. This in turn decreases thermal conductivity of the air inside the pores.

It is particularly preferable for the porous material in accordance with the present invention to have a mean pore size of 100 nm or less. The mean pore size of 100 nm or less is equal to or less than the mean free path of the molecules in the atmosphere, which produces a drastic decrease of the thermal conductivity of the air inside the pores thereby improving the heat insulation of the resultant porous material. Although the lower the lower limit of the mean pore size, the better for the porous material, an allowable lower limit of the mean pore size in the present invention is about 1 nm.

A preferred apparent density is 500 kg/m$^3$ or less, because when the porous material has this apparent density, the skeletal volume can be minimized and therefore the thermal conductivity of the skeleton of the porous material can be decreased. Similarly, the lower the lower limit of the apparent size, the better for the porous material. An allowable lower limit of the apparent density in the present invention is about 50 kg/m$^3$.

The porous material in accordance with the present invention may be shaped in any form, for example, a block, a sheet, a plate, a powder, and the like.

The porous material in accordance with the present invention may comprise a carbon material obtained by baking the above-mentioned polyimide resin dry gel. The porous material comprising such carbon material sustains the shape of the dry gel. When it has an apparent density of 800 kg/m$^3$ or less and a mean pore size of 1 $\mu$m or less, then it has particularly excellent performance.

In general, a porous carbon material obtained by baking and carbonizing the polyimide resin has been used for electrode material or active carbon. The porous material comprising such carbon material in accordance with the present invention is composed of a low dense carbon material and, therefore, has a large specific surface area and exhibits excellent performance as a carbon material.

Any porous carbon material having a specific surface area of 400 m$^2$/g or more as measured by the known Brunauer-Emmett-Teller (BET) method exhibits much better performance as a carbon material. Therefore, when the porous material is used as a carbon material, it is desirable even for the dry gel of the polyimide resin to have a specific surface area of 400 m$^2$/g or more as measured by the BET method before being baked.

FIG. 1 illustrates a cross-sectional view of a heat insulator produced by using the porous material in accordance with the present invention.

A porous material 1 obtained by the present invention is used as a core and housed in a gas-tight vessel 2. Then, the vessel 2 is evacuated and sealed air-tightly which produces a heat insulator. Vacuum evacuation of the vessel 2 would give a vacuum heat insulator of much better performance.

When the intended use of the porous material is a heat insulator, then it is desirable that the porous material has a mean pore size of 100 nm or less. This is because when the mean pore size is at this level, an equivalent thermal conductivity to that obtained by evacuating a vessel filled with a conventional vacuum heat insulating material composed of a powder to an extent of a vacuum degree of 0.01 Torr or so can be achieved by mere evacuation of the vessel to an extent of 10 to 100 Torr. The small pore size of the porous material in accordance with the present invention largely contributes to the above effect.

Figure 2:
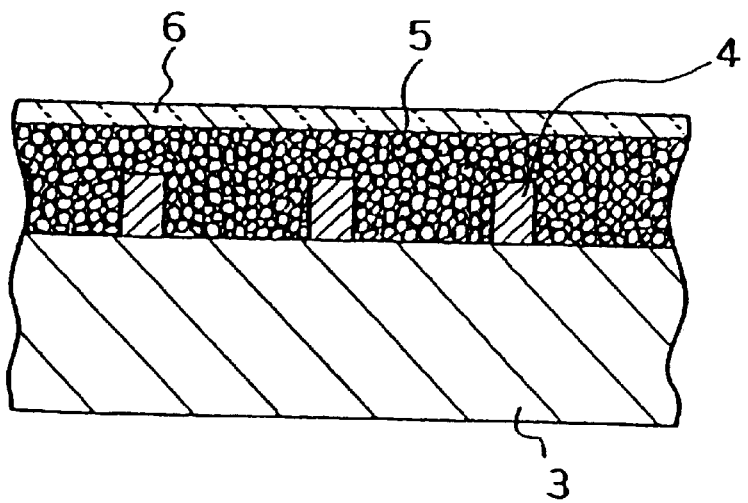
FIG. 2 is a schematic representation illustrating a cross-section of a semiconductor circuit including the porous material in accordance with the present invention as an interlayer insulating film.

The porous material in accordance with the present invention with such excellent performance can be applied as an interlayer insulating film for semiconductor circuits. FIG. 2 is a schematic cross-sectional view of an example of a semiconductor circuit formed with an interlayer insulating film comprising the porous material in accordance with the present invention. As shown in FIG. 2, electrodes 4 made of a metal or the like that are arranged on a semiconductor board 3 and then an interlayer insulating layer 5 made of the porous material in accordance with the present invention is formed such that it covers and embeds gaps between the electrodes 4. A protective layer 6 is further formed above the interlayer insulating layer 5. Alternatively, the circuit may be made into a multilayered circuit by forming an element or a device on an upper layer with an omission of the protective layer 6.

Since the porous material in accordance with the present invention is greater in volume occupied by air compared to that of the gel skeleton and has small and dense-packed pores, it can retain the strength surprisingly. Therefore, the porous material of the present invention can be used as a dielectric material with a low dielectric constant which can retains the structural strength in the above-mentioned semiconductor circuit.

The use of the porous material in accordance with the present invention in a semiconductor circuit or a printed board reduced dielectric loss of their electrical insulator thereby realizing rapid signal transmission. The porous material of the present invention can also reduce loss of electric power at high frequencies if included in electric or electronic appliances. The application to a roller such as motor can reduce leakage of electric power at high frequencies thereby realizing energy savings of the device.

The following is a brief explanation of the method for producing a porous material in accordance with the present invention.

The method for producing a porous material in accordance with the present invention can be roughly classified into two types. One type method contains the processes A, B and C. The other type method contains the process D. The order of the steps in each method type will be explained referring to FIG. 3.

Figure 3:
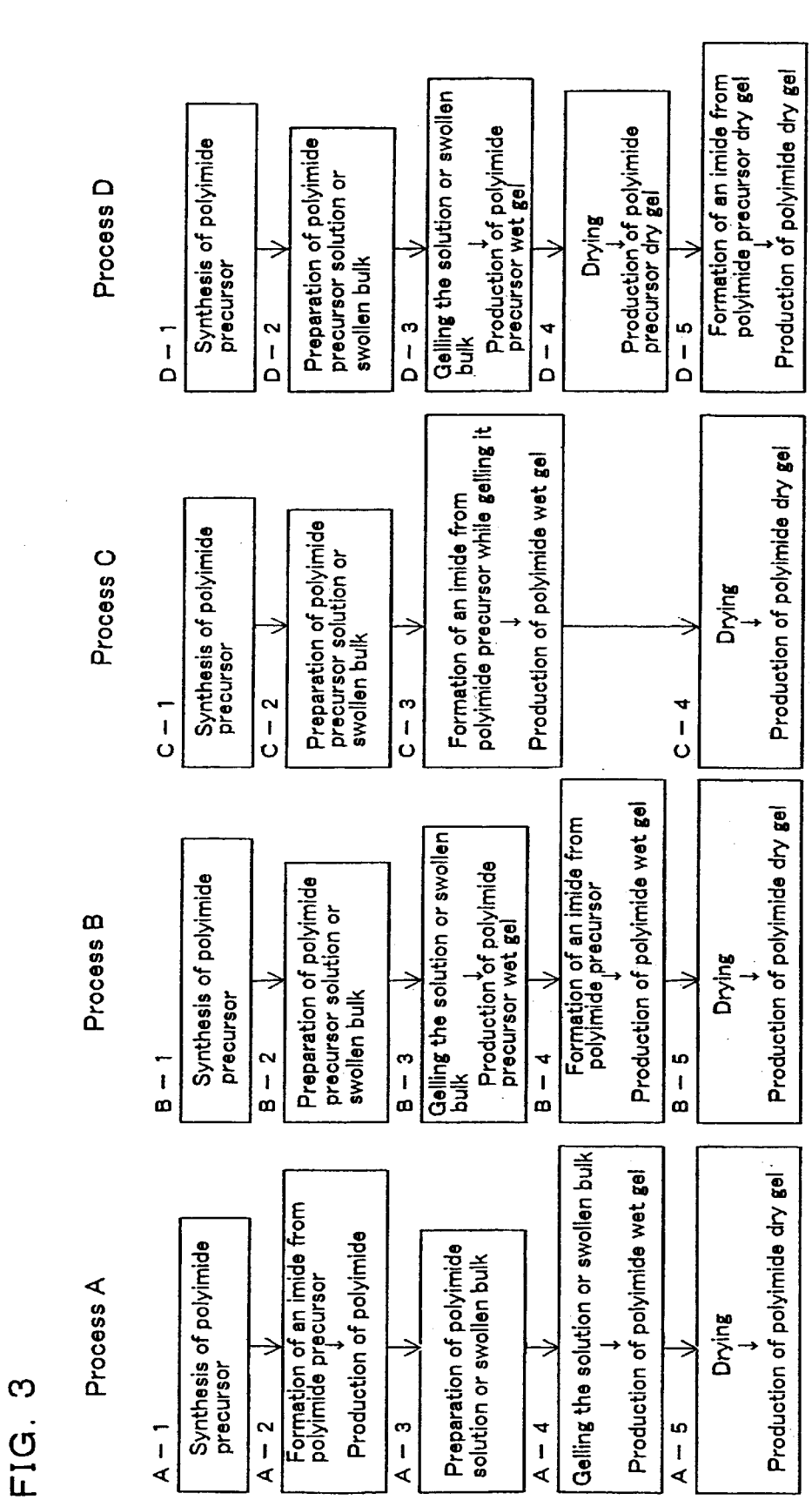
FIG. 3 is a flow chart illustrating the production steps of the porous material in accordance with the present invention.

As shown in FIG. 3, Processes A, B and C form a polyimide wet gel and dry it to obtain a dry gel of a polyimide resin. The three processes were classified according to the step of produce the polyimide wet gel.

Process A obtains a polyimide resin by imidizing a polyimide precursor in first. Then, after dissolving the resultant resin in a solvent to have a polyimide resin solution or after giving the resultant resin an affinity for the solvent to form a swollen body of the polyimide resin, the solution or the swollen body is gelled by crosslinking the polyimide resin to form a polyimide wet gel.

Process B obtains a solution or a swollen body of a polyimide precursor in first. Then, the solution or the swollen body is gelled to form a wet gel of the polyimide precursor, and then an imidization is carried out from the resultant wet gel as it is. When the wet gel is heated as it is to form an imide, the solvent to be selected should be one having a high boiling point. Otherwise, the wet gel can be formed into an imide by chemical treatment.

Process C obtains a solution or a swollen body of a polyimide precursor in first. Then, the solution or the swollen body is gelled while heating it to accelerate their gelling and the polyimide precursor is imidized at the same time thereby obtaining a polyimide wet gel.

A comparison of the three processes A, B and C shows that Process A has an advantage over the other two processes because the gel is prevented from being shrunk during imidization, which technically facilitates dimensional designing. However, Process A is limited in that it requires selection of a polyimide molecular structure that is soluble or wettable in a solvent.

On the other hand, Process D obtains a solution or a swollen body of a polyimide precursor, and then gels them to form a wet gel of the polyimide precursor. Subsequently, the resultant wet gel is dried to obtain a dry gel. Then, the dry gel is imidized to obtain a dry gel of a polyimide resin.

Process D is characterized in that it permits preformation of a skeleton of the resultant porous material by the polyimide precursor because the polyimide precursor is readily soluble in the solvent, facilitating production operation of the porous material. Process D is particularly effective for obtaining a polyimide resin which is hardly soluble in a solvent. In Process D, drying by heating is suited for a final step of imidization an imide in order to prevent the dry gel from being wetted again.

If production of a porous material comprising a carbon material is intended, then the process further includes a step of carbonizing the dry gel of the polyimide resin obtained in the above-mentioned manner by heating. Carbonization should be performed in a vacuum or an inert gas atmosphere in order to prevent the dry gel from being burnt during carbonization.

A particularly preferred simple method is baking the dry gel in an inert gas atmosphere such as nitrogen or argon or in an atmosphere at 500° C. or higher. Temperatures of 500° C. or higher can accelerate carbonization of the dry gel. In order to achieve complete carbonization, the heating temperature should be 800° C. or higher, preferably 1,000° C. or higher. An upper limit of heating temperature may be about 1500° C., because the carbonization may proceeds effectively.

If the intended use of the porous material obtained by the above-mentioned method is an active carbon, then activation with the use of water vapor or inorganic salt may be supplemented to the carbonization.

In the following, the method for producing a porous material in accordance with the present invention will be described more specifically referring to FIG. 3.

(1) Process A:
(i) Step A-1

Step A-1 synthesizes a polyimide precursor.

In general, the polyimide resin is synthesized by condensation reaction of a compound such as an aromatic or aliphatic tetracarboxylic dianhydride (hereinafter referred to as compound "a") with a compound such as an aromatic or aliphatic diamine (hereinafter referred to as compound "b"). Therefore, a polyamide acid which is a polyimide precursor is synthesized by condensation of the compounds "a" and "b". The polyimide precursor can be processed into a sheet because it is soluble in any organic solvent.

To enhance the solubility of the polyimide precursor and polyimide resin obtained in the below-mentioned step A-2 in an organic solvent, the molecular structures of the compounds "a" and "b" should be selected. Compounds having an ether group or a ketone group as the main chain and those having a bulky group such as phenyl group, alkyl group or trifluoromethyl group as the side chain are readily soluble in any solvent.

Introduction of a hydroxyl group, a sulfonic group, a carboxylic group, an amino group or the like as a substitutional group can improve the solubility and wettability of the resultant polyimide precursor and polyimide resin. Such substitutional group plays a role as a crosslink forming portion during gelling.

Exemplary compound "a" may include pyromellitic dianhydride, bisphenyltetracarboxylic dianhydride, benzophenontetracarboxylic dianhydride, 4,4'-hexafluoroisopropylidenebis (phtalic anhydride), cyclobutanetetracarboxylic dianhydride, and 2,3,5-tricarboxycyclopentyl acetic dianhydride. These compounds can be used alone or in arbitrary combinations to the extent not to damage the effects of the present invention.

Exemplary compound "b" may include p-phenylenediamine, m-phenylenediamine, bis (4-aminophenyl)ether, 4,4'-diaminotriphenylmethane, 2,2-bis(4-aminophenyl)-hexafluoropropane, 4,4'-diamino-4"-hydroxytriphenylmethane, 3,3'-dihydroxy-4,4'-diaminobiphenyl, 2,2-bis(3-amino-4-hydroxyphenyl)-hexafluoropropane, and 3,5-diaminobenzoic acid. These compounds can also be used alone or in arbitrary combinations to the extent not to damage the effects of the present invention.

The compounds "a" and "b" as the starting materials are not limited to the above examples and any compounds may be used if their combination can form a resin having a polyimide structure.

As the solvent used in synthesizing the polyimide precursor, N-methylpyrrolidone, N,N-dimethylacetamide, dimethyl sulfoxide, hexamethylphosphoric amide or the like are widely used, for example. Also, cresol, tetrahydrofuran, dioxane or methanol may be selected depending on the intended molecular structure of the resultant polyimide. These solvents may be used alone or in arbitrary combinations.

Of the above-exemplified solvents, those having a high boiling point of 100° C. or higher can be used in synthesizing the polyimide resin by heat treatment in Step A-2, in addition to synthesizing the polyimide precursor.

(ii) Step A2

The polyimide precursor obtained in Step A-1 is imidized by heating or a chemical treatment with a dehydrated solvent such as acetic anhydride or pyridine to form a polyimide resin. The polyimide resins thus obtained are mostly highly resistant to and hardly soluble in the solvent.

The treatment to form a polyimide from the polyimide precursor can be roughly classified into two groups: one is heat treatment and the other is chemical treatment.

Imidization by heating is performed at about 50 to 400° C. Preferably, heating should be done in a range of 100 to 300° C. Imidization is a reaction where an imide ring is formed by dehydration of polyamide acid. Therefore, stepwise elevations of the heating temperature, 100° C. for one hour, 200° C. for one hour and 300° C. for one hour, for example, are better than an abrupt elevation. The atmosphere is preferably an inert gas atmosphere such as nitrogen or argon other than air. Heating in a vacuum may also be adopted.

Imidization by chemical treatment may be performed by, for example, immersing the polyimide precursor in a dehydrated solvent such as acetic anhydride or pyridine to form an imide ring. Since this method is a wet method, it is not suited for imidizing the dry gel of the polyimide precursor as done in the above-mentioned process D.

(iii) Step A-3

Step A-3 obtains a solution or a swollen body of the polyimide resin. As the solvent in this step, polar or nonpolar solvents, such as xylene, toluene, hexane, cyclohexane, 2-butanone, methanol, ethanol, 2-methoxyethanol, dichloromethane, and the like may be used alone or in arbitrary combinations in addition to the above-exemplified solvents for synthesis. Water may be added to these solvents to wet the polyimide resin. However, when the polyimide resin has a hydrophilic group such as hydroxyl group, carboxylic group or sulfonic group in the skeleton, then the use of mere water is enough.

The polyimide resin solution is prepared by selecting a solvent which can dissolve the resin components and adjusting the weight of resin components and the volume of the solvent to make an intended apparent density of the finally obtained dry gel.

Similarly, the polyimide resin swollen body is prepared by selecting a solvent as listed above which can swell the resin components and adjusting the weight of resin components and the volume of the solvent to make an intended apparent density of the finally obtained dry gel.

The solvent to be used here may be a mixed solvent. If one solvent is used, one which has a high affinity for resin components but does not dissolve them is preferred. When the resin contains, for example, a hydroxylic group as component, a suited solvent is water or alcohol.

If a mixed solvent is used, it may be a mixture selected from those which dissolve the resin components and those which do not; for instance, N-methylpyrrolidone and methanol may be selected. When the solvents to be mixed are insoluble in each other, they may be formed into a colloidal emulsion when mixed with the resin components.

(iv) Step A-4

Here, gelling process to obtain a wet gel from the solution or swollen body of the polyimide resin will be described.

In case of the swollen body, it is sometimes formed into a wet gel as it is depending on the solvent used. In order to enhance the strength of the resultant gel, crosslinking treatment is often effective. The crosslinking treatment can be performed by introducing a functional group such as a hydroxylic group, a carboxylic group, a sulfonic group, an amino group or the like into a resin component and adding a crosslinking agent reactive to the introduced functional group.

As the crosslinking agent, any agent may be used if it has a functional group reactive to the functional group contained in the resin components. Applicable functional groups for this purpose may be exemplified as hydroxylic group, methylol group, amino group, isocyanate group, epoxy group, aldehyde group, carboxylic group, chloroformyl group, chlorosilyl group, and alkoxysilyl group. As the crosslinking agent having any of the above-exemplified functional groups, those having two or more functional groups are preferred in order to retain the strength of the gel skeleton. In order to crosslink those functional groups, an acid, a base or an acid anhydride may be added as a hardening agent.

Specific exemplary crosslinking agents include ethylene glycol, diols such as 1,4-butanediol, cyclopentane-1,2-diol and the like, polyhydric alcohols such as glycerin, pentaerythritol and the like, resins having a methylol group such as phenolic resin, melamine resin and the like, ammonia, amines such as methylamine, polyhydric amines such as ethylenediamine, hexamethylenediamine, phenylenediamine, diethylenetriamine and the like, isocyanates such as tolylene diisocyanate, diphenylmethane diisocyanate, hexamethylene diisocyanate and the like, epoxy resins such as phenylglycidyl ether, ethylene glycol diglycidyl ether, bisphenol A diglycidyl ether, novolak diglycidyl ether and the like, aldehydes such as formaldehyde, acetalhehyde, furfural, benzaldehyde and the like, dialdehydes such as glyoxal succindialdehyde, glutardialdehyde, phthalaldehyde and the like, dicarboxylic acids such as maleic acid, oxalic acid, adipic acid, suberic acid, sebacic acid, phthalic acid and their acid chloride compounds, acidic anyhdrides such as phthalic anhydride, maleic anhydride and the like, silane compounds such as tetrachlorosilane, trichlorosilane, tetramethoxysilane, tetraethoxysilane and their condensed silane oligomers. It is needless to say that the present invention is not limited to those crosslinking agents.

(v) Step A-5

Next, the drying step for obtaining a dry gel from the wet gel will be described. The drying step can be performed by using any routine drying method such as natural drying, drying by heating or drying under reduced pressure, supercritical drying method, or freeze drying method.

Reduction of the solid components in the wet gel to obtain a dry gel with a low density will impair the strength of the resultant gel. Furthermore, when the wet gel is subjected to simple drying, the resultant gel is shrunk due to stress induced by evaporation of the solvent from the wet gel. The above-mentioned crosslinking treatment is effective for reducing such shrinkage due to drying. The use of supercritical or freeze drying method prevents shrinkage of the gel during drying. Supercritical drying and freeze drying are suitable drying methods for producing a low dense porous dry gel, because they allow drying the wet gel with no risk of stress on the gel skeleton due to surface tension by eliminating liquid-gas interface by changing the solvent phase to a supercritical fluid phase, thereby preventing the gel from shrinking during drying. The dry gel obtained by the supercritical drying method is particularly called "aerogel". The solvent to be used for the supercritical drying method can be the same as that used for the wet gel; however, substitution with a solvent which is easy to handle during supercritical drying is desirable.

Exemplary solvents for this purpose include alcohols such as methanol, ethanol and isopropanol, and carbon dioxide all of which directly change the solvent into an supercritical fluid. Substitution with any routine easy-to-handle organic solvent such as acetone, isoamyl acetate or hexane which are known to be readily eluted as an supercritical fluid is also recommended.

The supercritical drying should be performed in a pressed vessel such as autoclave. When the solvent is methanol, for example, supercritical drying should be done under supercritical conditions of methanol, that is, a pressure of 8.09 MPa and a temperature of 239.4° C. or higher by gradually releasing the pressure while holding the temperature constant. When the solvent is carbon dioxide, supercritical drying should be done under supercritical conditions of carbon dioxide, that is, a pressure of 7.38 MPa and a temperature of 31.1° C. or higher by releasing the pressure in the supercritical state of carbon dioxide to make it gaseous while holding the temperature constant similar to the above.

(2) Process B:

(i) Step B-1

The first step of Process B is preparation of a polyimide precursor in the same manner as in Step A-1.

(ii) Step B-2

The next step is production of a solution or a swollen body of the polyimide precursor in the same manner as in Step A-3. The solvent to be used here can be the same as that used for producing the polyimide resin solution or swollen body.

Here, formation of a tertiary amine such as triethylamine at the portion of a carboxylic group in the polyamide acid, namely in the polyimide precursor enhances the affinity for water thereby facilitating swelling the polyimide precursor. In other words, in order to dissolve or swell the polyimide precursor, it is desirable to make the polyamide acid as the precursor have a salt structure by reacting the carboxylic group in the polyamide acid with a tertiary amine such as triethylamine. This is because control of affinity of the polyimide precursor for organic solvent or water results in control of dissolution or swelling of the polyimide precursor.

The polyimide precursor solution is prepared by selecting a solvent which can dissolve resin components and adjusting the weight of resin components and volume of the solvent so that the final dry gel can have an intended apparent density. Similarly, the polyimide precursor swollen body is prepared by selecting a solvent which can swell resin components and adjusting the weight of resin components and volume of the solvent so that the final dry gel can have an intended apparent density.

As stated previously, a single solvent or a mixed solvent may be used as the solvent. When a single solvent is used, one which has a high affinity for the resin components but does not dissolve them is desirable. When the resin has a hydroxyl group, exemplary suitable solvents are water and alcohols. When the polyimide precursor is intended to be swollen, formation of a tertiary amine such as triethylamine at the carboxylic site of the polyamine acid which forms the resin skeleton enhances the affinity for water of the polyimide precursor thereby facilitating swelling the precursor.

When a mixed solvent is used, it is possible to select one which can dissolve the resin components such as N-methylpyrrolidone, for example, and one which cannot such as methanol, for example. When the selected solvents are not soluble in each other, then they may be made into a colloidal emulsion when mixed with the resin components.

(iii) Step B-3

In Step B-3, the polyimide precursor solution or swollen body is gelled in the same manner as in Step A-4 to obtain a wet gel of the polyimide precursor.

(iv) Steps B-4 and B-5

The resultant polyimide precursor wet gel is imidized to obtain a polyimide wet gel which is then dried to produce a polyimide dry gel. These steps can be performed in the same manner as in Steps A-2 and A-5.

(3) Processes C and D:

Process C is basically the same as Process B except that imidization is performed simultaneously with drying in Step C-3.

Alternatively, the polyimide precursor may be heated in wet state in Step C-3 to form an imide therefrom. When the polyimide precursor is made into a polyimide, it becomes insoluble and forms a gel. Crosslinking treatment is also effective for enhancing the strength of the resultant gel.

Process D is also the same as Process B except that the order of the steps of imidization and drying is reversed.

The polyimide dry gel obtained by any of Processes A to D can be used as a porous material as it is or otherwise may be formed into a carbon material by carbonization. The resultant carbon material can be used as a porous material.

Carbonization is performed by placing and heating the dry gel in a heated oven such as electric oven, atmospheric furnace or dry distillation furnace. Heating can be done at 500° C. or higher which is a generally accepted highest heat-resistant temperature of the polyimide resin in an inert gas atmosphere such as nitrogen or argon. When the temperature is over this range, the polyimide resin will be condensed by itself and is carbonized.

In the following, advantageous technical features of the porous material in accordance with the present invention obtained by any of the above-mentioned processes will be summarized.

The production method of the present invention can produce a porous material of a dry gel comprising a polyimide resin having an apparent density of 1,000 kg/m$^3$ or less and a mean pore size of 1 μm or less.

Particularly, the present invention can provide a porous material having an apparent density of 800 kg/m$^3$ or less and a mean pore size of 1 μm or less which can serve as a porous material with excellent heat insulation and dielectric characteristics. The present invention can also provide a porous material having an apparent density of 500 kg/m$^3$ or less and a mean pore size of 100 nm or less which can demonstrate excellent heat insulation under atmospheric pressure. It is also possible to provide a porous material having a specific surface area of 400 m$^2$/g or more as measured by the BET method.

General thermoplastic resins have a heat-resistant temperature of 200° C. or lower because they are molten and softened at 200° C. or lower. The heat-resistant temperature of thermoset resin is around 250° C. because the thermal decomposition starts at 200° C. or higher.

To the contrary, bulky polyimide resins have been considered to tolerate continuous use at 250° C. or higher and are heat-resistant up to 400° C. if used unsteadily.

The porous material in accordance with the present invention exhibits almost the same heat resistance as that of nonporous bulky polyimide resin and therefore can serve as a highly heatproof porous material.

The present invention can further provide a porous material having a thermal conductivity of 0.025 W/mK or less at a mean temperature of 24° C. under atmospheric pressure which is lower than the value of 0.035 W/mK of commonly used glass wool. When this porous material has a mean pore size of 100 nm or less, then it can serve as a porous material with an even lower thermal conductivity (0.017 W/mk or less).

When the porous material in accordance with the present invention is filled into a laminated film vessel made of aluminum or stainless steel and vacuum-sealed, then a heat insulator having a thermal conductivity of 0.012 W/mK or less and exhibiting excellent heat insulation will result.

The present invention can further provide a porous material having a specific dielectric constant less than 2 at 1 MHz. Bulky polyimide resins have a specific dielectric constant of ca. 3.3 at 1 MHz. The specific dielectric constant of tetrafluoroethylene which is a material having the lowest specific dielectric constant among other bulky materials is ca. 2 which value is higher than that of the porous material of the present invention. As such, the porous material of the present invention is excellent even at high frequencies.

EXAMPLES

In the following, the present invention will be described more specially by way of concrete examples. However, the present invention is not limited to those examples.

EXAMPLE 1

In this example, the porous material in accordance with the present invention was produced according to the process A.

The compound "a" was 4,4'-hexafluoroisopropylidenebis (phthalic anhydride) and the compound "b" was 2,2-bis(3-amino-4-hydroxyphenyl)-hexafluoropropane. Those compounds "a" and "b" were mixed in N,N'-dimethylacetamide (hereinafter abbreviated to "DMAc") to make a molar ratio of 1:1 and a polyimide precursor was synthesized at room temperature.

The solution thus obtained was reprecipitated using methanol and dried. The resultant solid polyimide precursor was heated primarily at 100° C. for 1 hour and then at 200° C. for 2 hours under gaseous nitrogen stream to imidize the precursor to give a polyimide resin.

The resultant polyimide resin (10 g) was dissolved in 50 cc tetrahydrofuran (hereinafter abbreviated to "THF") which gave a polyimide solution. To the solution hexamethylene diisocyanate (3 g) was added as a crosslinking agent and heated at 55° C. for 3 days which gave a polyimide wet gel. The polyimide wet gel was placed in a stainless steel autoclave and subjected to supercritical drying at 50° C. under 9 MPa using carbon dioxide which gave an aerogel of a polyimide dry gel.

The dry gel thus produced in accordance with the process A had an apparent density of about 300 kg/m$^3$, a mean pore size of 40 nm and a BET specific surface area of 600 m$^2$/g. The dry gel remained stationary in apparent density even after being left in a thermostat at 300° C. for 2 hours, indicating excellent heat resistance.

The resultant porous material had a thermal conductivity of about 0.020 W/mK at a mean temperature of 24° C. The porous material was then placed in an aluminum laminated film vessel and the vessel reduced in pressure to make an internal pressure of 0.01 Torr and sealed. The heat insulator thus obtained had a thermal conductivity of about 0.008 W/mK at the mean temperature of 24° C., which indicated excellent heat insulation.

EXAMPLE 2

In this example, the porous material in accordance with the present invention was produced according to the process B.

Using pyromellitic anhydride as the compound "a", 3,3-dihydroxy-4,4'-diaminobiphenyl as the compound "b", and N-methylpyrrolidone (hereinafter abbreviated to "NMP") as the solvent, a polyimide precursor was synthesized in the same manner as in Example 1. The resultant solution was diluted with NMP to make a solution containing the polyimide precursor at 0.10 g/cc.

To the solution p-phtalic chloride was added at 0.04 g/cc as the crosslinking agent and heated at 80° C. to crosslink the polyimide precursor which gave a wet gel of the polyimide precursor.

The wet gel thus obtained was heated (imidized) at 160° C. for 5 hours to make a polyimide wet gel. The heat treatment produced no marked shrinkage or contraction of the wet gel.

The polyimide wet gel was immersed in a formaldehyde aqueous solution and then added with diluted hydrochloric acid to crosslink the polyimide at 80° C. for 2 days. After the solvent was replaced with acetone, the crosslinked polyimide wet gel was dried at 50° C. under reduced pressure which gave a polyimide dry gel.

The dry gel thus produced in accordance with the process B had an apparent density of about 180 kg/m$^3$, a mean pore size of about 100 nm and a BET specific surface area of about 800 m$^2$/g. The dry gel remained stationary in apparent density even after being left in a thermostat at 300° C. for 2 hours, indicating excellent heat resistance.

EXAMPLE 3

In this example, a porous material comprising a carbon material was produced by heating the polyimide dry gel obtained in Example 2 at 1,000° C. for 1 hour in a nitrogen atmosphere for carbonization.

The carbon material formed from the dry gel had an apparent density of about 200 kg/m$^3$, a mean pore size of about 90 nm and a BET specific surface area of about 800 m$^2$/g. The carbon material retained the low dense porous structure despite slight shrinkage. Measurement of electric resistance using a tester showed decreased electric resistance of the porous material after carbonization compared to that before carbonization.

EXAMPLE 4

In this example, the porous material in accordance with the present invention was produced according to the process C.

Using 4,4'-hexafluoroisopropylidenebis (phthalic anhydride) as the compound "a", 4,4-diamino-4"-hydroxytriphenylmethane as the compound "b", and DMAc as the solvent, a polyimide precursor was synthesized in the same manner as in Example 1. The resultant solution was reprecipitated in methanol and dried which gave a solid polyimide precursor. p 8 Gram of the resultant polyimide precursor was dissolved in 50 cc m-cresol to make a solution of polyimide precursor. To 4 g of the solution succinic dialdehyde was added as the crosslinking agent and heated at 160° C. for 1 day to imidize and crosslink the resultant polyimide at the same time. In this way, a polyimide wet gel was obtained. After the solvent m-cresol was replaced with methanol, the wet gel was placed in a stainless steel autoclave and subjected to supercritical drying at 250° C. under 10 MPa which gave an aerogel of a polyimide dry gel.

The dry gel thus produced in accordance with the process C had an apparent density of about 250 kg/m$^3$, a mean pore size of about 80 nm and a BET specific surface area of about 800 m$^2$/g. The dry gel remained stationary in the property such as apparent density even after being left in a thermostat at 300° C. for 2 hours, indicating excellent heat resistance.

The resultant porous material had a thermal conductivity of about 0.018 W/mK at the mean temperature of 24° C. The porous material was then placed in an aluminum laminated film vessel and the vessel was reduced in pressure to make an internal pressure of 10 Torr and sealed. The heat insulator thus obtained had a thermal conductivity of about 0.0108 W/mK at the mean temperature of 24° C., which indicated excellent heat insulation.

EXAMPLE 5

In this example, the porous material in accordance with the present invention was produced according to the process A.

The compound "a"was pyromellitic anhydride and the compound "b" was 3,3'-dihydroxy-4,4'-diaminobiphenyl plus 4,4'-diaminodiphenyl ether. Those compounds "a" and "b" were mixed in NMP to make a molar ratio of 1:0.5:0.5 and a polyimide precursor was synthesized at room temperature.

The solution thus obtained was reprecipitated using methanol and dried. The resultant was dissolved in NMP again, then processed into a sheet by a cast method and dried. Then, the polyimide precursor sheet was subjected to imidization by heating at 200° C. for 3 hours in a nitrogen atmosphere to give a polyimide resin sheet.

The polyimide resin sheet was immersed in a methanol/water mixed solvent and heated at 50° C. for 1 day which gave a polyimide swollen body. The swollen body was further heated for 7 days consecutively as it was to make a gel. The polyimide wet gel thus obtained was subjected to supercritical drying using carbon dioxide which gave a polyimide dry gel.

The dry gel thus produced in accordance with the process A had an apparent density of about 500 kg/m$^3$, a mean pore size of about 700 nm and a BET specific surface area of about 450 m$^2$/g.

Next, the polyimide dry gel was carbonized at 800° C. in a nitrogen atmosphere to produce a porous material of carbon material. The resultant porous material had an apparent density of about 800 kg/m$^3$, a mean pore size of about 600 nm and a BET specific surface area of about 500 m$^2$/g. Measurement by a tester confirmed a decrease in electric resistance.

EXAMPLE 6

In this example, the porous material in accordance with the present invention was produced according to the process D.

A polyimide precursor was synthesized in the same manner as in EXAMPLE 5 using the same compounds as those of EXAMPLE 5 for the compounds "a" and "b" and THF/methanol as the solvent. The polyimide precursor was mixed with methanol to which novolak polyglycidyl ether and phthalic anhydride were further added as crosslinking agents to make a polyimide precursor wet gel.

The wet gel was dried at 60° C. for 3 days in a nitrogen atmosphere and a polyimide precursor dry gel was produced. The dry gel was further subjected to imidization by heating at ascending temperatures of 150° C. for 1 hours, 200° C. for 1 hour and 250° C. for 1 hour in a nitrogen atmosphere to give a polyimide dry gel.

The dry gel thus produced in accordance with the process D had an apparent density of about 250 kg/m$^3$, a mean pore size of about 80 nm and a BET specific surface area of about 600 m$^2$/g.

EXAMPLE 7

In this example, a polyimide precursor was synthesized at room temperature by mixing bisphenyltetracarboxylic anhydride as the compound "a" and 3,3'-dihydroxy-4,4'-diaminobiphenyl as the compound "b" in DMAc to make a molar ratio of 1:1. The resultant solution was diluted with a triethylamine aqueous solution to form a polyimide precursor triethylamine salt. The resultant mixed solution was reprecipitated in methanol which gave a solid polyimide precursor triethylamine salt.

The solid salt was added to a water/ethanol solution containing tetraethoxysilane as the crosslinking agent which gave an emulsion of swollen triethylamine salt as polyimide precursor.

The emulsion was coated on a silicone board arranged with copper electrodes. The board was heated primarily at 70° C. for 1 hour, then at 90° C. for 1 hour and finally at 110° C. for 1 hour to crosslink and gel the polyimide precursor emulsion. Then, the gel thus obtained was dried. The gel was further imidized by drying at 200° C. for 2 hours in a vacuum. In this way, an interlayer insulating layer of a polyimide dry gel was formed on the board. A silica protective film was further formed on the interlayer insulating layer by a chemical vapor deposition method which gave a semiconductor circuit.

The interlayer insulating layer of the semiconductor circuit thus formed had an apparent density of about 400 kg/m$^3$ and a mean pore size of about 100 nm. The interlayer insulating layer had an inter-electrode specific dielectric constant of about 1.4 at 1 MHz which value was lower than the value of about 3.3 of the bulky polyimide resin. The lower specific dielectric constant reduced leakage of electric power at high frequencies to about half the original leakage and improved the signal transmission delay 1.5 times.

As discussed above, the present invention can provide porous materials exhibiting excellent heat resistance and having a low density and a small mean pore size. The use of any porous material in accordance with the present invention enables a provision of a heat insulator with low thermal conductivity and excellent heat insulation. The present invention can also provide a heat insulator with a low dielectric constant which demonstrates superb dielectric characteristics at high frequencies.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

What is claimed is:

1. A porous material comprising a dry gel of a polyimide resin, said porous material having an apparent density of 800 kg/m$^3$ or less and a mean pore size of 1 μm or less.

2. The porous material in accordance with claim 1, wherein said polyimide resin has a three-dimensional crosslinked structure.

3. The porous material in accordance with claim 1, wherein said dry gel is an aerogel.

4. A porous material comprising a carbon material obtained by baking the porous material in accordance with claim 1, said porous material having an apparent density of 800 kg/m$^3$ or less and a mean pore size of 1 μm or less.

5. A heat insulator formed by filling the porous material in accordance with claim 1 in a vessel.

6. The heat insulator in accordance with claim 5, wherein said vessel is a gas-tight vessel and has been reduced in internal pressure.

* * * * *